United States Patent [19]

Berglund et al.

[11] 3,888,732
[45] June 10, 1975

[54] INLET FOR FUEL ASSEMBLY HAVING FINGER CONTROL RODS

[75] Inventors: Ake Berglund; Antti Suvanto; Lars Tornblom, all of Vasteras, Sweden

[73] Assignee: Allmanna Svenska Elektriska Aktiebolaget, Vasteras, Sweden

[22] Filed: Sept. 14, 1973

[21] Appl. No.: 397,302

Related U.S. Application Data

[63] Continuation-in-part of Ser. No. 286,834, Sept. 6, 1972, abandoned.

[52] U.S. Cl. .................. 176/50; 176/35; 176/61; 176/78
[51] Int. Cl. .......................................... G21c 15/02
[58] Field of Search ............ 176/50, 36, 35, 07, 87, 176/78, 79, 61

[56] References Cited
UNITED STATES PATENTS

| | | | |
|---|---|---|---|
| 3,361,639 | 1/1968 | Ashcroft et al. | 176/86 R |
| 3,390,052 | 6/1968 | McDaniels, Jr. | 176/35 |
| 3,407,115 | 10/1968 | North, Jr. et al. | 176/78 |
| 3,481,832 | 12/1969 | Rickert | 176/50 |
| 3,650,895 | 3/1972 | Sodergard | 176/36 |
| 3,666,624 | 5/1972 | Finch et al. | 176/50 |
| 3,691,011 | 9/1972 | Kruger et al. | 176/36 |
| 3,713,971 | 1/1973 | Van Santen et al. | 176/35 |

*Primary Examiner*—Harvey E. Behrend

[57] ABSTRACT

In a nuclear reactor with vertically arranged fuel assemblies positioned on supporting members and with control rods displaceably arranged in guide tubes between the fuel rods inside the fuel assemblies, the supporting plate is provided with a transverse end piece with throttling means for the liquid flow which passes from below up through the supporting member and past the fuel rods in the fuel assembly. The inlets for the guide tubes for the control rods are located below the end piece and the throttling means. In this way a higher pressure prevails at the inlet to the guide tubes than above the end piece, so that a stronger flow of coolant is produced through guide tubes than through the fuel assembly.

3 Claims, 6 Drawing Figures

INLET FOR FUEL ASSEMBLY HAVING FINGER CONTROL RODS

RELATED APPLICATIONS

The application is a continuation-in-part of application Ser. No. 286,834, filed Sept. 6, 1972, now abandoned.

BACKGROUND OF THE INVENTION

1. Field of the Invention

The invention relates to a nuclear reactor in which the core consists of vertically arranged fuel assemblies.

2. The Prior Art

In nuclear reactors in which the core consists of vertically arranged fuel assemblies placed on supporting members, the fuel assemblies will be exposed to a vertical force acting upward which is caused by the pressure required to force a sufficient liquid flow through the fuel assemblies and the guide tubes for the control rods. This upward force can exceed the dead weight of the fuel assemblies, and there is a risk of the fuel assemblies being displaced on the supporting members.

The problem concerning the great lifting power exerted on the fuel assemblies is particularly manifest in constructions in which the control rods are arranged inside the fuel assemblies. The control rods are displaceably arranged in guide tubes which are interspersed with, and preferably uniformly and symmetrically positioned among, the fuel rods in the fuel assembly. As it is desirable to maintain a lower temperature in the control rods than the temperature prevailing in the rest of the fuel assembly, a considerably greater liquid flow must be achieved through the guide tubes for the control rods than through the corresponding area elsewhere in the fuel assembly. This greater liquid flow can be brought about by increasing the area of the guide tubes, and this area is determined by the fact that as great a liquid flow through the guide tubes is to be achieved with the same fluid pressure as for the rest of the fuel assembly so that the control rod reaches the temperature desired. Such a device requires, however, that the guide tubes take up a relatively considerable part of the valuable space in the core. Another way to solve the problem concerning the greater liquid flow in the guide tubes is to maintain a higher pressure on the liquid flow there than in the rest of the fuel assembly.

SUMMARY OF THE INVENTION

The present invention relates to an arrangement in nuclear reactors in which the core consists of vertically arranged fuel assemblies placed on supporting members and having control rods displaceably arranged in guide tubes positioned between the fuel rods inside the fuel assemblies, for achieving a stronger flow of coolant through the guide tubes for the control rods than through the rest of the fuel assembly. In accordance with the invention, the supporting member is provided with an end piece having throttling means for the liquid flow which passes from below up through the supporting member and past the fuel rods in the fuel assembly, whereas the inlets to the guide tubes for the control rods are located below the end piece with its throttling means, where a higher pressure prevails than above the end piece.

Because the throttling means for the flow of coolant which passes the fuel rods are arranged in the end piece fastened to the supporting members, the lifting power on the fuel assembly will be decreased, so that there is no longer any risk of the fuel assembly being disarranged in the core.

DESCRIPTION OF THE PREFERRED EMBODIMENTS

Figure 1:
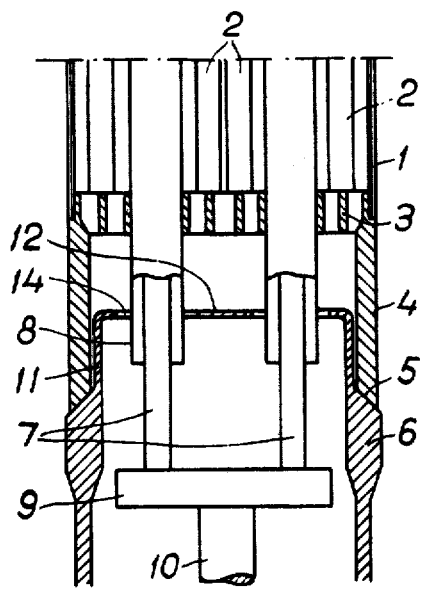
FIG. 1 shows a cross-section through the lower part of a fuel assembly, which is placed on its supporting plate.

The fuel assembly 1 comprises a number of rods consisting of tubes which contail fuel elements. The rods are supported at the bottom by an end piece 3 in the form of a lattice, usually with circular or square cross-section. The end piece is provided with a flange 4 extending downward and ending in a supporting surface 5 which rests against a corresponding seat on a supporting member 6 at the bottom of the core when the fuel assembly is installed in the core. The fuel assembly also contains a number of finger control rods 7 displaceably arranged in guide tubes 8. The guide tubes with their control rods are placed between the fuel rods and arranged according to a certain pattern inside the fuel assembly and are supported by the lattice 3. The guide tubes project below the end piece 3 and the control rods project from the guide tubes. All the control rods for each fuel assembly are connected at their lower ends to a yoke 9 which, in turn, is attached to a control rod drive shaft 10 operated from a control rod drive device (not shown in the drawings) for adjusting the position of the control rods 7 in the fuel assembly 1.

The supporting member 6 is provided at its upper end with a flange 11, in the example shown directed upward, which ends in a flat end piece 12. According to the embodiment of the invention shown in FIG. 2, there are four holes 13 in the end piece. The holes 13 are circular in this form and their diameter is greater than the outer diameter of the guide tubes 8. From FIG. 1 it is clear that the guide tubes 8 extend downward through the holes, so that the guide tubes extend below the end piece. Since the diameter of the holes 13 is greater than the diameter of the guide tubes 8, there exists around each guide tube an annular gap 14 (in FIG. 1), and these gaps together form throttling means for the upward liquid flow which is to pass through the fuel assembly. The upward force caused through the throttling means is absorbed by the supporting member 6 and thus does not affect the fuel assembly itself. However, as the throttling means is located above the orifices of the guide tubes, the fluid pressure prevailing at the orifices of the guide tubes will become higher than that prevailing at the end piece 3. Thus, by means of a device according to the invention, two advantages are achieved: the upwardly directed force on the fuel assembly is reduced and the flow rate through the guide tubes is increased, because of the absence of throttling points.

The supporting members 6 constitute enlargments near the upper ends of tubes 32, which extend downwardly therefrom and have inwardly tapering portions 33 in which are formed openings 34 to permit the flow into the tubes of coolant which is fed into the tank 31 through pipe 35. The lower portions 36 of the tubes are of constant diameter and are secured in and supported by the bottom wall of the tank.

The portions 6 are of square cross-section and abut against each other for lateral support. The portions 6 are enclosed within and fit in a frame 30 which is secured on the inner wall of the tank 31.

Figure 2:
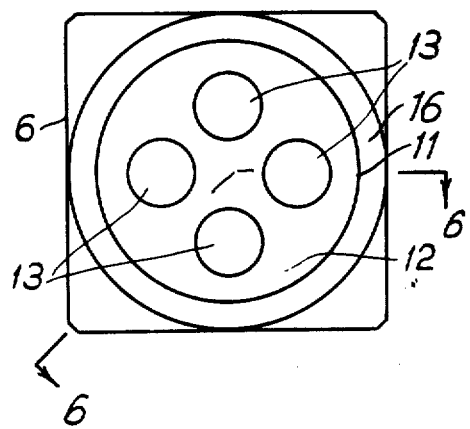
FIGS. 2 and 3 show views from above of two different embodiments of the supporting member.

In the form of FIG. 2, the surface 16 on which the surface 5 rests is annular in shape, projecting upwardly from the square portion of the supporting member 6. The flange 11 is also round, as is the lower end portion 4 of the fuel assembly 1.

Figure 3:
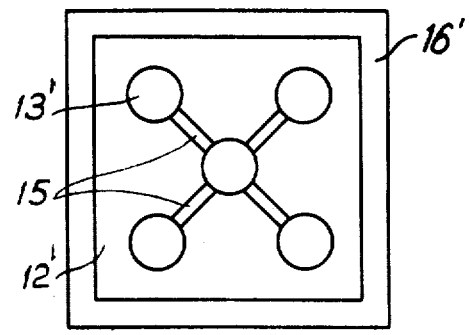
Figure 4:
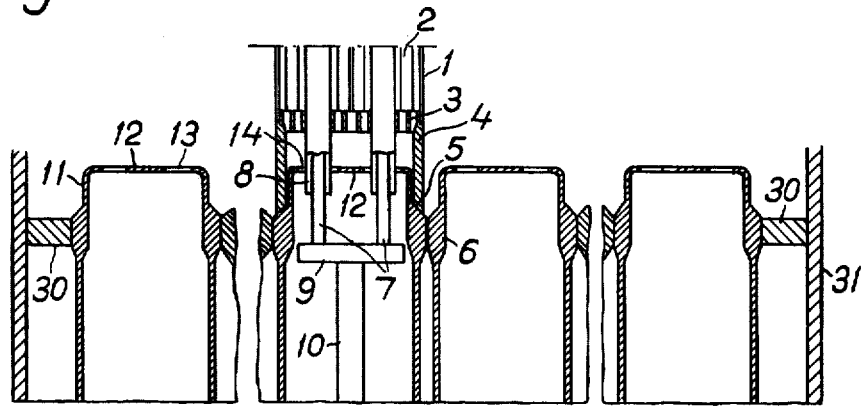
FIG. 4 is a cross-section through a reactor embodying the invention.
Figure 4:
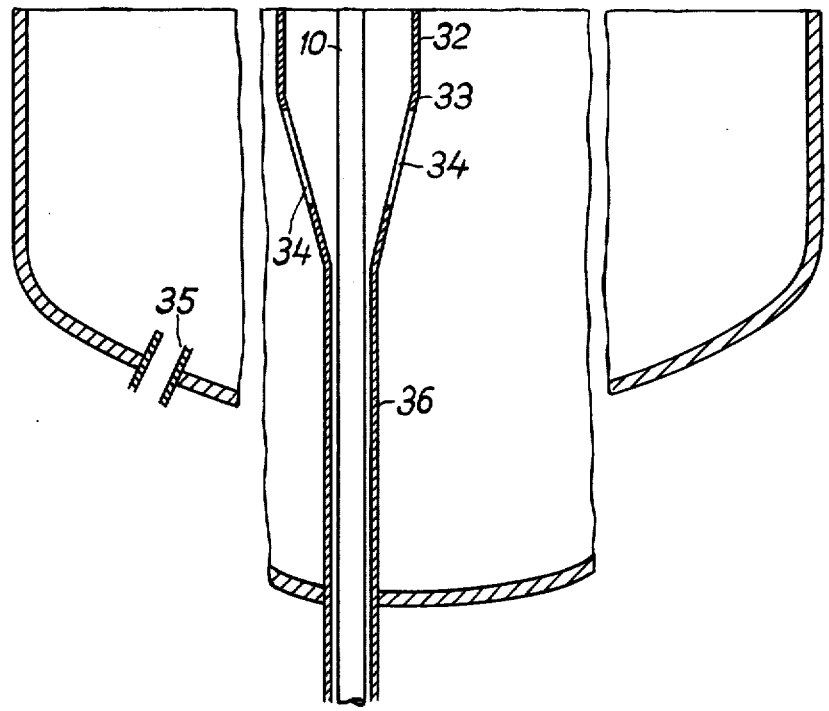
Figure 6:
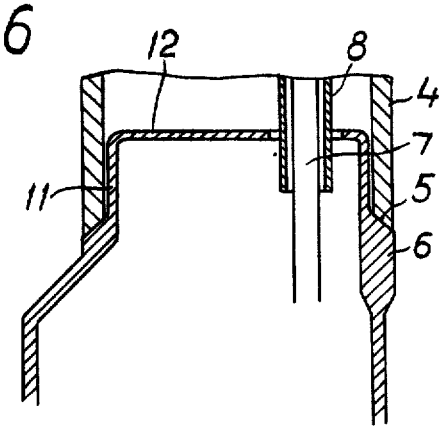
FIG. 6 is a cross-section on the line 6—6 of FIG. 2.
Figure 5:
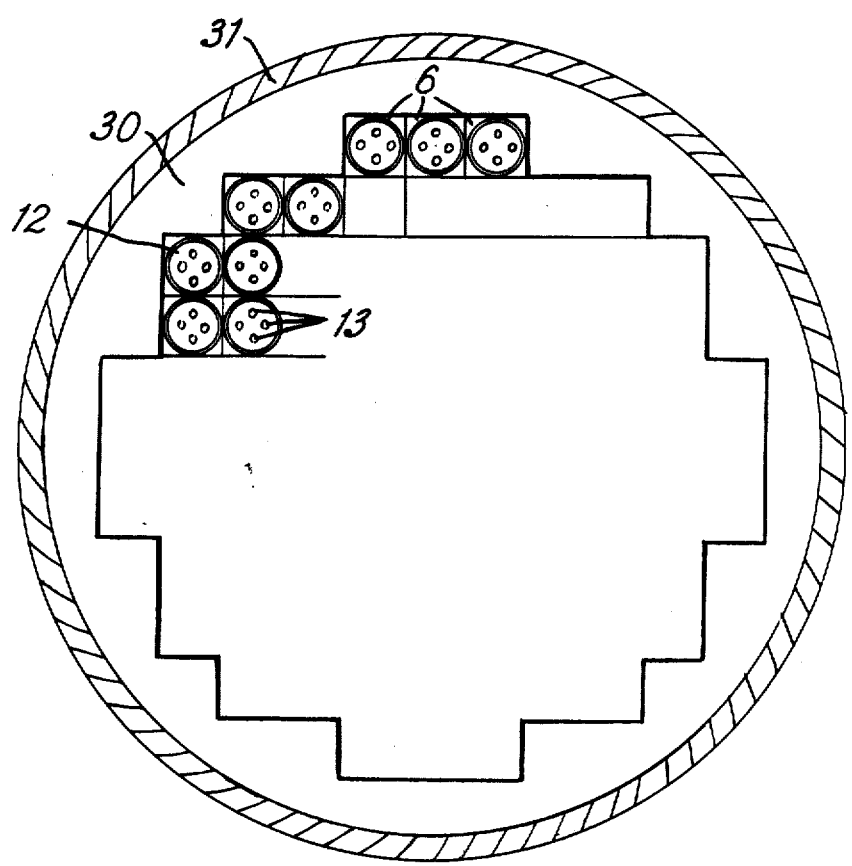
FIG. 5 is a plan view.

In the form shown in FIG. 3, the supporting surface 16 of the supporting member can be made as a square, and then it may be advisable to use a control rod placed in a central position and four more control rods arranged between the central control rod and the corners of the supporting surface, in order to achieve a more even distribution of the control rods. Then it may be advisable to connect the five holes 13' in the flange 12' by a cross-formed slot 15 which will then also act as a throttling means. In such a case it may be necessary to reduce the diameter of the holes, in order to compensate for the increased through-flow area caused by the slot 15. In this case the downward extensions of the fuel assemblies are also square.

The throttling means achieved by means of the annular gaps around the guide tubes and, whenever applicable, also by means of the cross-formed slot 15 can be supplemented by further holes in the end piece 12.

Because the supporting member has been drawn up in the form of a preferably cylindrical flange with an end piece, the inlet throttling means will be located a short distance up in the end piece of the fuel assembly. This means that the guide tubes will be well positioned, and at the same time they can be made so short that they are protected by the end piece of the fuel assembly. This construction allows a fuel assembly to be put directly on its end piece without the ends of the guide tubes being damaged.

We claim:

1. In a liquid-cooled nuclear reactor having a bottom wall in which the core comprises vertically arranged fuel assemblies (1) placed on supporting members (6) comprising tubular members secured to the bottom wall and extending upwardly therefrom and having openings thereinto for cooling liquid and having control rods displaceably arranged in guide tubes (8) positioned between the fuel rods (2) inside the fuel assemblies, the bottom end of said fuel assemblies and the top portion of said supporting members having mating surfaces, the top of said supporting member (6) being closed with a horizontal end piece (12) having openings therein forming throttling means (14, 15) for liquid flow which passes from below up through the supporting member and past the fuel rods in the fuel assembly, said end piece being affixed to and a part of said supporting member, the lower ends of said guide tubes passing through said openings in said end piece to a position below said end piece, said lower ends of said guide tubes also being inlets to the guide tubes (8) for the control rods (7), where a higher pressure prevails at the inlets to the guide tubes than above the end piece, whereby a stronger flow of coolant is produced through the guide tubes than through the rest of the fuel assembly.

2. In an arrangement as claimed in claim 1, the throttling means comprising holes in the end piece, the cross-section of the holes having the same shape as the cross-section of the guide tubes and the guide tubes extending through the holes so that the throttling means is located around the guide tubes, the area of the throttling means being thus equal to the difference between the area of the holes and the cross-section of the guide tubes.

3. In an arrangement as claimed in claim 1, the end piece (12) having a central hole for a control rod located centrally in the fuel assembly and additional holes arranged symmetrically around the central hole, and slots (15) in the end piece between the central hole and the other holes.

* * * * *